United States Patent
Huidekoper (10) Patent No.: US 9,895,926 B2
(45) Date of Patent: Feb. 20, 2018

(54) VEHICLE WHEEL

(71) Applicant: Louis Huidekoper, London (GB)

(72) Inventor: Louis Huidekoper, London (GB)

( * ) Notice: Subject to any disclaimer, the term of this patent is extended or adjusted under 35 U.S.C. 154(b) by 69 days.

(21) Appl. No.: 14/760,662

(22) PCT Filed: Feb. 21, 2014

(86) PCT No.: PCT/NL2014/050109
§ 371 (c)(1),
(2) Date: Jul. 13, 2015

(87) PCT Pub. No.: WO2014/129900
PCT Pub. Date: Aug. 28, 2014

(65) Prior Publication Data
US 2015/0352897 A1 Dec. 10, 2015

(30) Foreign Application Priority Data
Feb. 21, 2013 (NL) ..................... 2010341

(51) Int. Cl.
*B60B 23/10* (2006.01)
*B60B 5/02* (2006.01)
(Continued)

(52) U.S. Cl.
CPC .............. *B60B 5/02* (2013.01); *B60B 21/104* (2013.01); *B60B 23/08* (2013.01); *B60B 23/10* (2013.01);
(Continued)

(58) Field of Classification Search
CPC ......... B60B 5/02; B60B 21/104; B60B 23/10; B60B 23/08; B60B 2900/10;
(Continued)

(56) References Cited

U.S. PATENT DOCUMENTS 1,923,747 A * 8/1933 Stanley ................... B60B 23/10
301/12.1
4,243,269 A * 1/1981 Walther ................. B60B 11/06
301/12.1
(Continued)

FOREIGN PATENT DOCUMENTS

DE 9108842 U1 9/1991
FR 242 5331 * 7/1979
(Continued)

OTHER PUBLICATIONS

International Search Report for PCT/NL2014/050109; dated Jun. 27, 2014; 11 pgs.
(Continued)

*Primary Examiner* — S. Joseph Morano
*Assistant Examiner* — Jean Charleston
(74) *Attorney, Agent, or Firm* — Gardner Groff Greenwald & Villanueva, PC (57) ABSTRACT

The invention is directed to a vehicle wheel (1) comprising a fiber reinforced polymer rim (2) for receiving a tire at its radially outer side (3). The rim (2) comprises an outer rim flange (4), an outer rim seat (5), a frusto-conical plane (6) inclined at an angle a relative to the rotational axis (7) of the wheel of between 1 and 90 Q, an inner rim seat (8) and an inner rim flange (9). A wheel hub (10) is connected to the rim (2) via a metal support element (11). The support element (11) is connected with the rim (2) through at least one connecting element (12) which extends through a radially elongated opening (13) in the frusto conical plane (6) of the rim (2) and is received in the support element (11). The support element (11) may alternatively be connected with the rim (2) through at least three connecting elements (12) which extend through radially elongated openings (13) in the support element (11).

13 Claims, 7 Drawing Sheets

(51) Int. Cl.
*B60B 21/10* (2006.01)
*B60B 23/08* (2006.01)
*B60B 25/00* (2006.01)

(52) U.S. Cl.
CPC ...... *B60B 25/002* (2013.01); *B60B 2310/305* (2013.01); *B60B 2360/10* (2013.01); *B60B 2360/341* (2013.01); *B60B 2900/10* (2013.01); *B60B 2900/111* (2013.01); *B60B 2900/3314* (2013.01); *B60Y 2200/11* (2013.01)

(58) Field of Classification Search
CPC ......... B60B 2310/305; B60B 2900/111; B60B 2900/3314; B60B 2360/10; B60B 3/041; B60B 3/042; B60B 3/044; B60B 3/045; B60Y 2200/11
USPC ............... 301/11.1, 11.2, 11.3, 12.1, 63.106, 301/64.301, 65, 95.101, 95.11
See application file for complete search history.

(56) References Cited

U.S. PATENT DOCUMENTS

| | | | |
|---|---|---|---|
| 4,982,998 A | 1/1991 | Mikawa | |
| 6,598,939 B2* | 7/2003 | Muller | B60B 3/002 |
| | | | 301/10.1 |
| 2015/0273934 A1* | 10/2015 | Huidekoper | B60B 5/02 |
| | | | 301/11.1 |

FOREIGN PATENT DOCUMENTS

| | | |
|---|---|---|
| FR | 2425331 A2 | 12/1979 |
| FR | 2471291 A1 | 6/1981 |
| WO | 2006097856 A2 | 9/2006 |

OTHER PUBLICATIONS

International Preliminary Report on Patentability for PCT/NL2014/050109; dated Aug. 25, 2015; 6 pgs.

* cited by examiner

VEHICLE WHEEL

TECHNICAL FIELD

The present invention relates generally to wheels and particularly to vehicle wheels for tires of vehicles.

BACKGROUND

One type of conventional wheel comprises a rim for receiving a tire at its radially outer side, wherein the rim comprises an outer rim flange, an outer rim seat, a frusto-conical plane inclined at an angle a relative to the rotational axis of the wheel of between 1° and 90°, an inner rim seat and an inner rim flange. A wheel hub is connected to the rim via a support element, wherein the support element is comprised of metal and wherein the rim is comprised of a fibre reinforced polymer. The support is connected with the rim through at least three connecting elements.

Such a vehicle wheel is described in WO-A-2006/097856. This publication describes a vehicle wheel having a rim made of carbon reinforced epoxy resin and a metal support element. The rim and support element are connected via numerous threaded bolts which extend through a frusto conical plane of the rim and are covered by the tire on one side and by the support element on its other side as shown in FIG. 3 of this publication.

Although the above problems can be resolved as explained a major disadvantage of the design of WO-A-2006/097856 remains. In use the support element can heat up to very high temperatures resulting for example from the heat generated by using the brakes or simply from exposing the wheel assembly to the sun in a hot climate, where it may reach a very high temperature. As a result temperatures variations of 100° C. or more for such a metal support element are not uncommon.

Because the materials of the support element and the rim are different the thermal expansion of the support element and rim will also be different. This can result in a high stress in the wheel assembly and ultimately to failure of the connection between rim and support element or the support elements itself or the wheel rim itself due to the increased stress and resulting fatigue over a period of otherwise normal use.

SUMMARY

The present invention aims at providing a vehicle wheel wherein the connection between the support element and the rim will, in use, incur less stress and thus have a longer lifetime.

This is achieved by the following vehicle wheel. A vehicle wheel comprising a rim for receiving a tire at its radially outer side, wherein the rim comprises an outer rim flange, an outer rim seat, a frusto-conical plane inclined at an angle a relative to the rotational axis of the wheel of between 1° and up to 90°, an inner rim seat and an inner rim flange, a wheel hub connected to the rim via a support element, wherein the support element is comprised of metal and wherein the rim is comprised of a fibre reinforced polymer, wherein the support element is connected with the rim through at least three connecting elements which extend through openings in the frusto conical plane of the rim and is received in the support element, wherein the opening in the frusto conical plane of the rim is a radially elongated opening or wherein the support element is connected with the rim through at least three connecting elements which extend through openings in the support element and is received in the frusto conical plane of the rim, wherein the openings in the support element are radially elongated openings.

Applicants found that when the openings in the frusto conical plane of the rim or alternatively in the support element are radially elongated openings less stress will result when the vehicle wheel is used and exposed to varying temperatures. The design of the openings allows small movement of the connecting elements in the radial direction, while maintaining perfect concentricity between the wheel rim and the wheel hub as the bolts remain perfectly located in the widths of the elongated openings. This significantly results in much less stress as compared to the stress which would result when the design of WO-A-2006/097856 is used in varying temperature conditions, because the resulting expansion or contraction of essentially circular components takes place radially. Additionally the openings can be manufactured with lower tolerances of the pitch circle diameter and placing the connecting elements is found to be easier. Further the temperature conditions at which the support element is connected to the rim is found to be less critical.

The material of the rim is comprised of a fibre-reinforced polymer and the material of the support element is comprised of a metal. Such a metal and such a fibre-reinforced polymer will typically have a very different thermal expansion. Because the temperature at the centre of the wheel may be higher than at the outer rim, differences in thermal expansion may result in thermal stresses.

Examples of metal materials are steel, beryllium containing alloys, for example copper-beryllium alloys, beryllium oxide, aluminium, magnesium or an aluminium or magnesium alloy.

Examples of fibre reinforced polymers, are polymers reinforced with glass fibre, carbon fibre, nylon fibre, polyethylene fibre, for example Carbon, Dynema and aramid type fibres, for example Kevlar or Twaron. Possible polymers may be thermoplastic or thermoset polymers. The thermoset polymer may be a polyester, a polyurethane or an epoxy resin. The thermoplastic polymer may be polyolefins, polyvinyl chloride, ethylene vinyl acetate, polymethylmethacrylate, polyamide or polyimide. An example of a suitable fibre reinforced polymer is a carbon fibre reinforced polymer. Preferably the polymer is a carbon fibre reinforced epoxy resin.

The fibres may be present as a woven matt, as uni-directional fibres, or as a random strand matt, alternatively the fibres may be injected together with the polymer when the rim is fabricated. The fibre reinforced polymer rim can be made using a mould with or without a vacuum moulding process, using high pressure in an autoclave or press system, using a Resin-Transfer-Moulding (RTM) process, prepreg processes, or using a resin injection moulding process, wherein optionally the fibres are injected simultaneously with the resin, or using a hand-lay-up processes or a combination of any of these processes. The openings in the rim can be moulded or may be machined in a next step for ease of manufacture.

Examples of how the fibre reinforced polymer rim may be manufactured are described in U.S. Pat. No. 6,367,531, EP2363272, WO2009036736, EPI353788, EP2331348, WO2006/097856 and US20050104441. For example carbon fibre reinforced epoxy resin may be wrapped in tangential direction around the rim, so that a particularly high torque resistance of the rim is accomplished. Furthermore, it is also possible to use woven fibre materials and layups as a fibre component in the epoxy resin, which are manufactured through the typical weaving process, so that e.g. a diagonal layer of fibres, a perpendicular, or a parallel layout, or a joint array of various directions of fibres with reference to the tangential plane of the base of the rim is present. Depending on the selection of the orientation of the fibres, the rim has different strength properties in different directions, as is customary in the industrial art of constructing fibre reinforced polymer components. A person skilled in the art can select the direction of the fibres in the epoxy resin, depending on the desired strength profile, can also select combinations of different fibre directions as fibre reinforcement to suit and compliment the purpose of the component.

The support element may be connected with the rim through at least three connecting elements which extend through radially elongated openings in the support element and is received in the frusto conical plane of the rim. Suitably the support element may be connected with the rim through at least three connecting elements which extend through radially elongated openings in the frusto conical plane of the rim. This latter embodiment is preferred because the connecting elements may be fitted in a less visible manner.

The radial elongated opening will allow a connecting element having suitably a circular cross-section to extend through the rim. The elongated opening may for example be an oval opening or a flat-sided oval opening or an opening manufactured by two or more bores just spaced away slightly. The small resulting edges which are left between the bores may be smoothed away afterwards. The opening may have one or two axis of symmetry. Preferably the radially elongated holes are flat-sided ovals. Preferably the radially elongated holes are flat-sided ovals. Because of the elongated opening some radial movement of the connecting element, having preferably a circular cross-section, is possible along the elongated radial direction of the opening. This movement of the connecting element in the opening will reduce the stress significantly when the support element expands due to thermal expansion while the rim does not expand or significantly less so. In addition it will also alleviate the tightness of precision of the manufacturing tolerances of the pitch circle diameters of the mating components and of the holes themselves. Preferably any movement along the circumferential direction is avoided. This is suitably achieved by using connecting elements having a diameter equal to the width of these radially elongated openings. By fixing the support element by means of at least 3 connecting elements, preferably equi-spaced along the circumferential of the frusto-conical plane, concentricity and an optimal drive is achieved.

Radial elongated according to the present invention is meant to include openings which are radially elongated and openings which are elongated in the frusto-conical plane in the direction of the radial.

The connecting elements are suitably sealed to avoid air from escaping from the tire via the openings in the rim. The seal is preferably provided at the radially outer side of the rim, i.e. at the side of the tire and thus invisible once the tyre is fitted. Per connecting element a separate seal may be provided. The seal may be made of paper, rubber, silicon, polyurethane, or from another elastomer. Examples of suitably seals are so-called Dowty seals. Besides the use of seals for sealing the rim, it is also possible, e.g. through the use compression bolts, or of bolts with a particularly shaped head, to provide leak tightness, wherein the connecting element is connected with the rim tight enough, so that a tight connection assembly is provided. The advantage of using a seal is that an excessively strong bolting, or riveting can be dispensed with, without jeopardizing the leak tightness of the rim. Alternatively the connecting element may be glued onto the rim at the radially outer side of the rim.

The rim and support element are connected by connecting elements. The connecting element may be any positive locking element. Examples of suitable connecting elements are bolts, compression bolts, rivets and the like which penetrate the rim from its radially outer side and lock with the support element through a threaded opening in the support element or any other locking mechanisms, such as cam screw connections. The support element may alternatively be provided with extensions which penetrate the rim from the radial inside and which extensions are fixed at the radial outside of the rim, for example by means of a nut or other locking or fastening device. Preferably the connecting element is a threaded bolt penetrating the rim from the radial outside towards the support element. The opening in the support element is then provided with a thread to receive the threaded bolt. The number of connecting elements is 3 or more. The optimal number of connections will depend on the radius of the wheel, its application and the loads applied. For a typical passenger vehicle wheel having a standard diameter, according to the international ETRTO norms, of between 10 inches and 35 inches the number of connecting elements is preferably between 10 and 100.

The support element may comprise of a circular outer part with the openings to receive the connecting elements and an inner part comprising a number of spokes directed to the wheel hub or alternatively comprised of an inner part with spokes extending towards the rim only. The number of spokes may be from a minimum of 3 to many more depending on the design.

The rim may be comprised of two rim components, each component comprising a part of an edge along the circumferential end of each rim component. These two parts may be fixed together using connecting elements present in the edge formed at the boundary where the two rim components meet. The use of two rim components is advantageous when the rim is comprised of a polymer and made by a moulding process utilising vacuum, pressure or both. By manufacturing the two rim components by means of such a moulding process the need for complex moulds with multiple sections is avoided. These two separate "wheel rim halves" may also be made of different materials, for instance one in metal and one in a fibre reinforced polymer.

The support element is connected with the rim through at least three connecting elements which extend through radially elongated openings in the frusto conical plane of the rim or the support element is connected with the rim through at least three connecting elements which extend through radially elongated openings in the support elements will be illustrated by the following Figures.

BRIEF DESCRIPTION OF THE DRAWINGS

FIG. 3b is a cross-sectional view BB' the wheel of FIG. 3a.

FIG. 4b is a cross-sectional view CC' the wheel of FIG. 4a.

FIG. 5b is a cross-sectional view DD' the wheel of FIG. 5a.

FIG. 6b is a cross-sectional view EE' the wheel of FIG. 6a.

DETAILED DESCRIPTION OF EXAMPLE EMBODIMENTS

Figure 1:
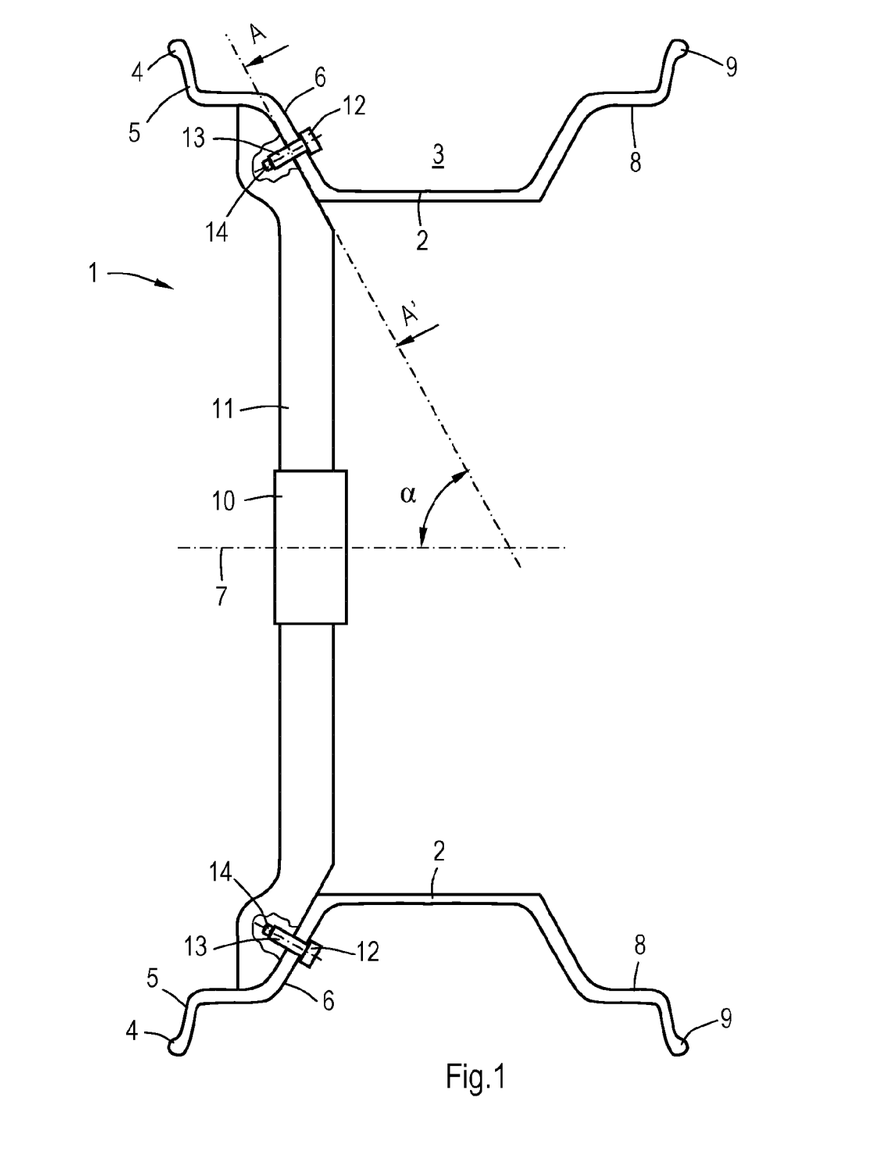
FIG. 1 is a vertical cross-sectional view of a wheel according to an embodiment of the invention.

FIG. 1 shows a vertical cross section of the wheel (1) according to the invention, perpendicular to the plane of the wheel. The vehicle wheel (1) has a rim (2) for receiving a tire at its radially outer side (3). The rim (2) is provided with an outer rim flange (4), an outer rim seat (5), a frusto-conical plane (6) inclined at an angle a relative to the rotational wheel axis (7) of the wheel (1), an inner rim seat (8) and an inner rim flange (9). Also a wheel hub (10) is shown connected to the rim (2) via a support element (11). The material of the rim (2) and the support element (11) is different. The support element (11) is connected with the rim (2) through threaded bolt connecting elements (12) which extends through a radially elongated opening (13) in the frusto conical plane (6) of the rim (2) and is by corresponding threaded bores (14) as present in the support element (11).

Figure 2:
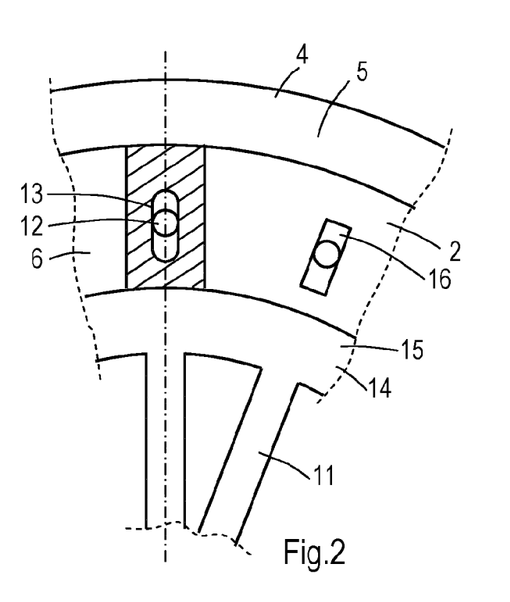
FIG. 2 is a cross-sectional view AA' the wheel of FIG. 1.

FIG. 2 is a cross-sectional view AA' of FIG. 1. FIG. 2 shows rim (2) partly cut through in the plane of radially elongated opening (13) and frusto conical plane (6). In opening (13) the threaded bolt (12) is shown. It is clear that bolt (12) will have a freedom to move along the elongated direction of opening (13). Because the plane (6) is at an angle α of between 1° and 90° movement to the wheel axis in the radial direction of bolt (12) and thus of support element (11) is made possible by the design of opening (13). The angle α may be between 20 and 90° or even between 45 and 80°. Also because of this angle α the elongation as shown for opening (13) will also be an elongation in the radial direction. FIG. 2 further shows part of the outer rim flange (4), the outer rim seat (S) and support element (11). Support element (11) is provided with a continuous ring part (15) and individual spokes (14). The openings (13) correspond with spokes (14). Per spoke (14) an opening (13) is present in the wheel according to these figures. FIG. 2 also shows an opening corresponding with a next spoke (14) as seen from the radially outer side (3) of the rim (2), wherein the bolt head of bolt (12) and a seal (16) is seen.

Figure 3A:
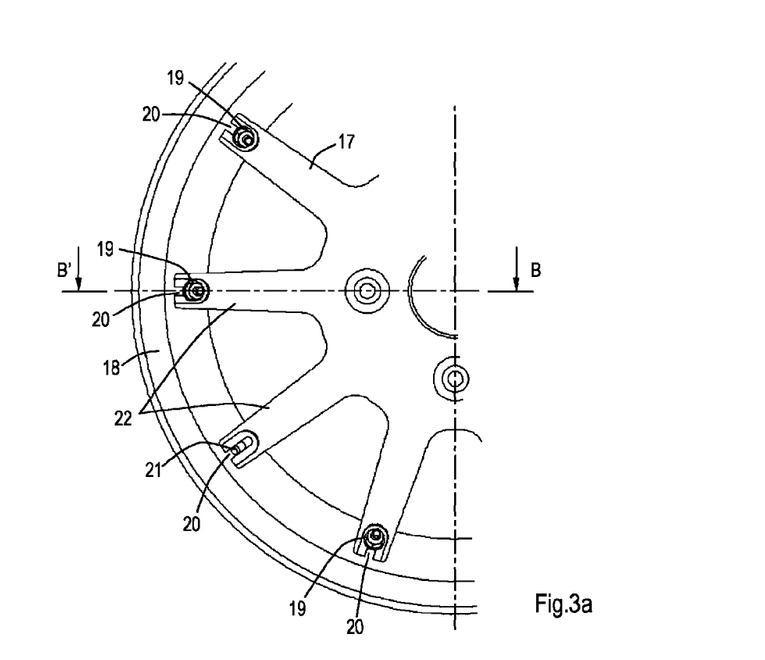
FIG. 3a is side view of a portion of a wheel according to another embodiment of the invention.

FIG. 3a shows an embodiment wherein the support element (17) is connected with the rim (18) through bolts (19) as the connecting elements which extend through radially elongated openings (20) in the support element (17). The openings (20) in this embodiment are elongated slots as present at the radial end of each spoke (22) of the support element (17). With elongated slots is here meant that the openings are open at its radially outer side as shown. Also shown is circular, i.e. non-radially extending, opening (21) in rim (18) where for illustration purposes only the connecting element (17) is not shown.

Figure 3B:
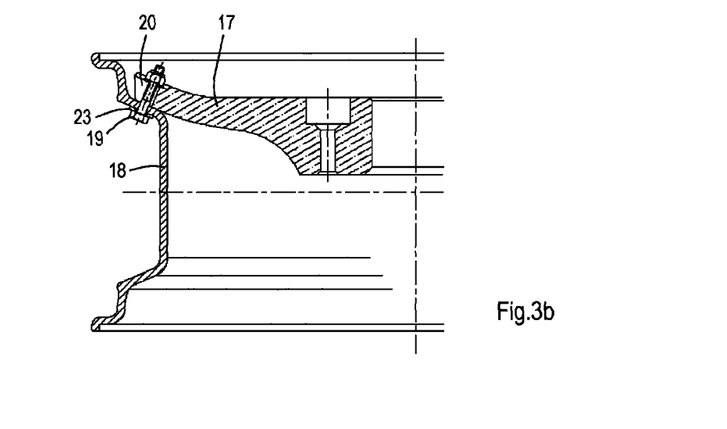

FIG. 3b is the cross-sectional view BB' of FIG. 3a. In addition to FIG. 3a Dowty seals (23) are present to seal of every bolt (19) in a gas tight manner.

Figure 4A:
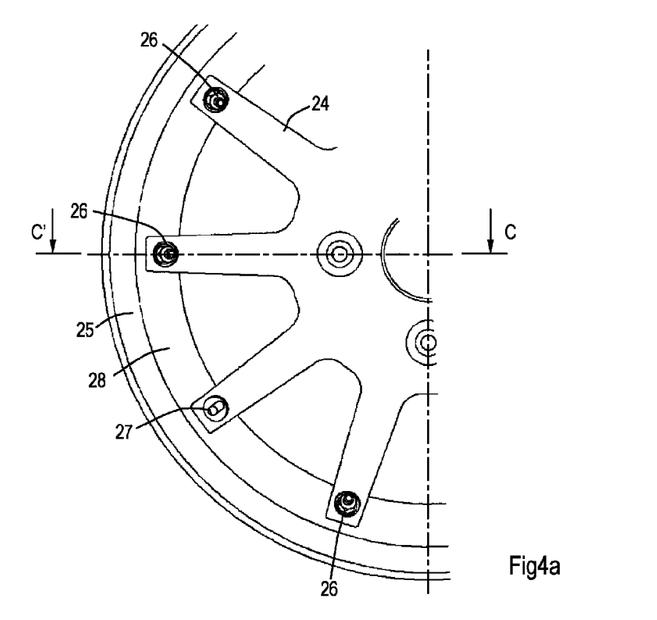
FIG. 4a is side view of a portion of a wheel according to another embodiment of the invention.

FIG. 4a the support element (24) is connected with the rim (2S) through at bolts (26) as the connecting elements which bolts (26) extend through radially elongated openings (27) in the spokes of the central support element where support element (24) meets with the frusto conical plane (28) of the rim (2S). Elongated opening (27) is visible in this FIG. 4a because the bolt is not shown for illustration purposes only.

Figure 4B:
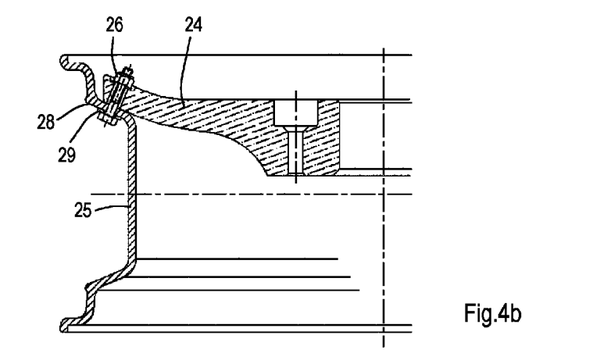

FIG. 4b is the cross-sectional view CC' of FIG. 4a. In addition to FIG. 4a Dowty seals (29) are present to seal of every bolt (19) in a gas tight manner at the outer surface of the rim (2S).

Figure 5A:
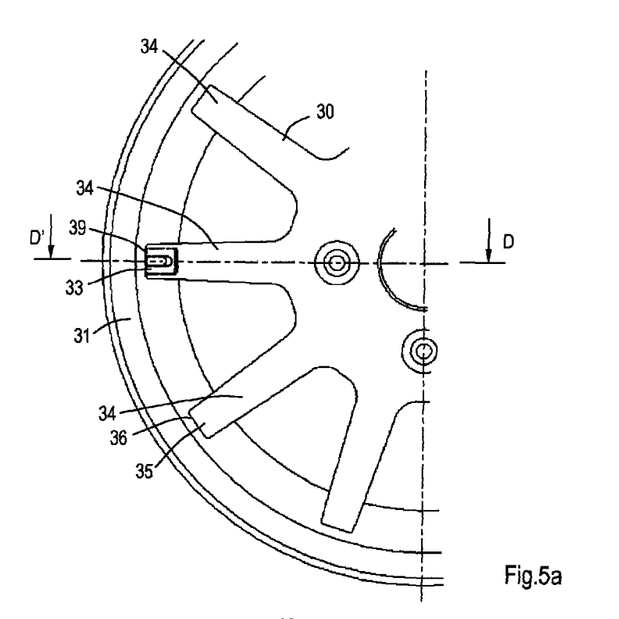
FIG. 5a is side view of a portion of a wheel according to another embodiment of the invention.

FIG. 5a shows an embodiment wherein the support element (30) is connected with the rim (31) through bolts (32) as the connecting elements which extend through radially elongated openings (33) in the support element (30) as in FIG. 3a. The openings (33) in this embodiment are elongated slots as present at the radial end of each spoke (34) of the support element (30). The difference with the wheel of FIG. 3a is that radially elongated opening (33) does not fully protrude the support element (30) thereby leaving a cover (3S). Cover (3S) as present at the tip (36) of each spoke (37) avoids that the bolts (32) are visible from the side (38) of the wheel, i.e. the side from which one sees the wheel when mounted to a vehicle. This is sometimes desired for aesthetic reasons and it also protects the bolts. At point (39) the slots are shown through cover (3S) for illustration purposes only.

Figure 5B:
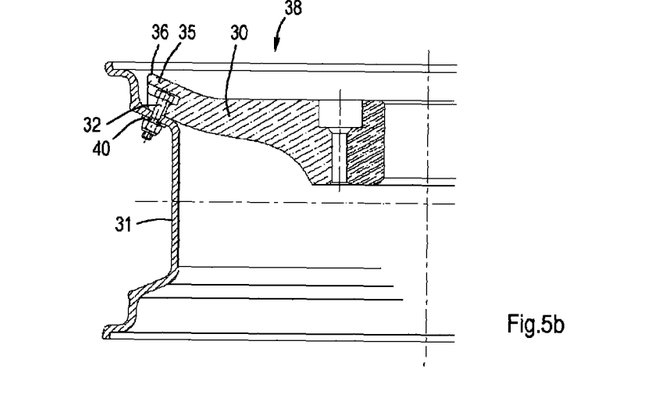

FIG. 5b is the cross-sectional view DD' of FIG. 5a. In addition to FIG. 5a Dowty seals (40) are present to seal of every bolt (32) in a gas tight manner at the outer surface of the rim (31).

Thus the invention is also directed to such a wheel wherein the support element is connected with the rim through at least three connecting elements which extend through openings in the support element and is received in the frusto conical plane of the rim, and wherein the openings in the support element are radially elongated slots present at the radially outer end of the support element. The elongated slot may not fully protrude the support element thereby leaving a cover, which cover avoids that the connecting members are visible from the outer side of the wheel, wherein with outer side is meant the side which is the visible outer side when the wheel is mounted to a vehicle. The support element may comprise spokes and wherein at the radially end of the spoke the elongated slots are present or wherein the support element comprises spokes ending at their radial end in a circular outer part, which circular outer part comprises the elongated slots.

Figure 6A:
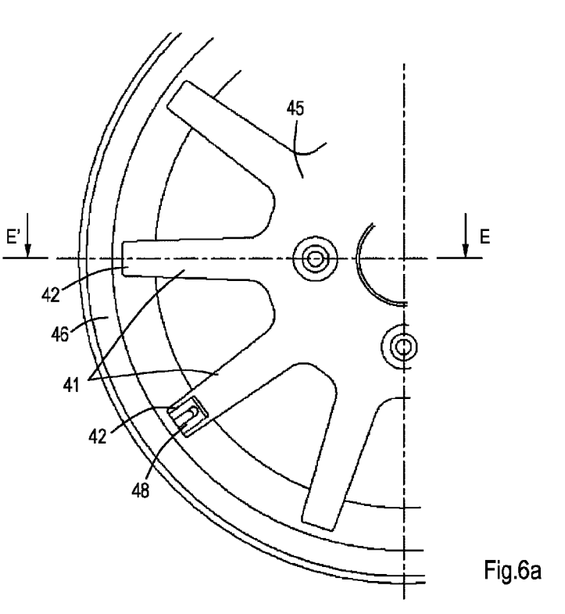
FIG. 6a is side view of a portion of a wheel according to another embodiment of the invention.
Figure 6B:
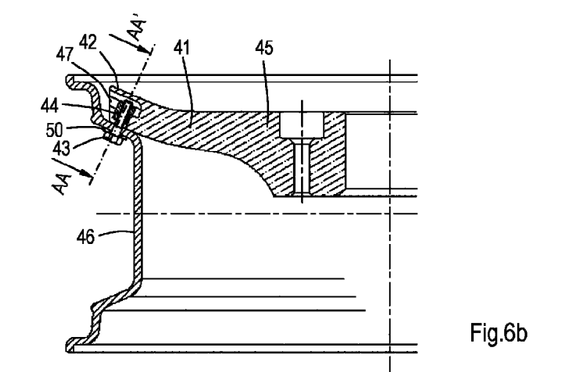
Figure 6C:
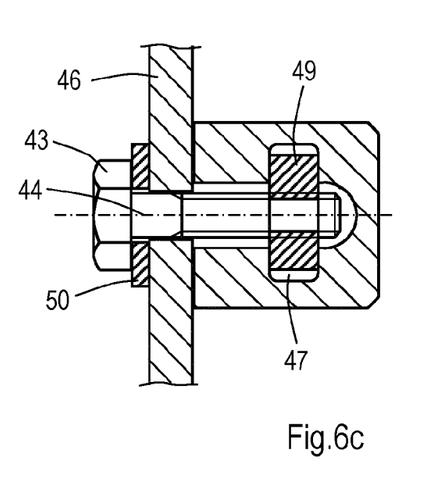
FIG. 6c is a cross-sectional view AAAA' the wheel of FIG. 6b.

FIGS. 6a, 6b and 6c show a variation of the wheel as shown in FIG. 5a with the bolts orientation 180 degrees turned around in combination with specially formed nuts, which may be easier to assemble than the solution shown in FIGS. 5a and 5b. FIG. 6b is cross sectional view EE' of FIG. 6a. FIG. 6c is cross sectional view AAAA' of FIG. 6b.

As in FIG. 5a the wheel is provided with spokes (41) which have a tip (42) which covers the bolts (43) and specially formed nut (44). The difference is that the nuts (44) of the bolt (43) are now at the support (4S) side of the rim (46). The bolt (43) is as such special in that it has extensions (49) which run in the T-section shaped slots (47) as part of the elongated opening (48) as present at the tip (42) of spoke (41). Because of extensions (49) and slots (47) of support (4S) the T-section nuts (44) cannot rotate in the slots (47) while they can slide radially up and down. This allows the bolts (43) to be tightened and support element (4S) to be fixed to rim (46) while facilitating some radial movement to due to the difference in thermal expansion. At point (48) part of the tip (42) is not shown for illustration purposes only. In FIG. 6b Dowty seals (SO) are present to seal of every bolt (43) in a gas tight manner at the outer surface of the rim (46).

While the invention has been shown and described in exemplary forms, it will be apparent to those skilled in the art that many modifications, additions, and deletions can be made therein without departing from the spirit and scope of the invention as defined by the following claims.

The invention claimed is:

1. A vehicle wheel, comprising:
   a rim for receiving a tire at its radially outer side, wherein the rim comprises an outer rim flange, an outer rim seat, a frusto-conical plane inclined at an angle α relative to the rotational axis of the wheel of between 1° and 90°, an inner rim seat and an inner rim flange; and
   a wheel hub connected to the rim via a support element, wherein the support element is comprised of metal and wherein the rim is comprised of a fibre reinforced polymer,
   wherein the support element is connected with the rim through at least three connecting elements which extend through openings in the frusto conical plane of the rim and is received in the support element,
   wherein the openings in the frusto conical plane of the rim are radially elongated openings or wherein,
   the support element is connected with the rim through at least three connecting elements which extend through openings in the support element and is received in the frusto conical plane of the rim, and
   wherein the openings in the support element are radially elongated openings.

2. The wheel according to claim 1, wherein the fibre reinforced polymer is a carbon fibre reinforced polymer.

3. The wheel according to claim 1, wherein the connecting element is a positive locking element.

4. The wheel according to claim 3, wherein the connecting element is a bolt protruding the rim from the radial outside and received in a threaded opening present in the support element.

5. The wheel according to claim 1, wherein the support element is connected with the rim through at least three connecting elements which extend through openings in the support element and is received in the frusto conical plane of the rim, and
   wherein the openings in the support element are radially elongated slots present at a radially outer end of the support element.

6. The wheel according to claim 5, wherein the elongated slot does not fully protrude the support element thereby leaving a cover, which cover avoids that the connecting members are visible from the outer side of the wheel, wherein with outer side is meant the side which is the outer visible side when the wheel is mounted to a vehicle.

7. The wheel according to claim 6, wherein the support element comprises spokes and wherein at the radially end of the spoke elongated slots are present or wherein the support element comprises spokes ending at their radial end in a circular outer part, which circular outer part comprises the elongated slots.

8. The wheel according to claim 5, wherein the support element comprises spokes and wherein at the radially end of the spoke elongated slots are present or wherein the support element comprises spokes ending at their radial end in a circular outer part, which circular outer part comprises the elongated slots.

9. The wheel according to claim 1, wherein the rim and the support element have a different thermal expansion.

10. A vehicle wheel, comprising,
    a rim for receiving a tire at its radially outer side, wherein the rim comprises an outer rim flange, an outer rim seat, a frusto-conical plane inclined at an angle α relative to the rotational axis of the wheel of between 1° and 90°, an inner rim seat and an inner rim flange; and
    a wheel hub connected to the rim via a support element, wherein the support element is comprised of metal and wherein the rim is comprised of a fibre reinforced polymer,
    wherein the support element is connected with the rim through at least three connecting elements which extend through openings in the frusto conical plane of the rim and is received in the support element, and
    wherein the openings in the frusto conical plane of the rim are radially elongated openings.

11. A vehicle wheel comprising,
    a rim for receiving a tire at its radially outer side, wherein the rim comprises an outer rim flange, an outer rim seat, a frusto-conical plane inclined at an angle α relative to the rotational axis of the wheel of between 1° and 90°, an inner rim seat and an inner rim flange; and
    a wheel hub connected to the rim via a support element, wherein the support element is comprised of metal and wherein the rim is comprised of a fibre reinforced polymer,
    wherein the support element is connected with the rim through at least three connecting elements which extend through openings in the support element and is received in the frusto conical plane of the rim, and
    wherein the openings in the support element are radially elongated openings.

12. A vehicle wheel for a tire, comprising:
    a wheel hub defining a rotational axis of the wheel;
    a wheel rim including a radially outer side for receiving the tire, including an outer rim flange, an outer rim seat, and a frusto-conical plane inclined at an angle α relative to the rotational axis of the wheel of between 1° and 90°, and including an inner rim flange and an inner rim seat, wherein the rim is comprised of a fibre-reinforced polymer;
    a support element connecting the wheel hub to the wheel rim, wherein the support element includes a radially outer end that is positioned adjacent the frusto-conical plane of the rim, wherein the support element is comprised of metal;
    at least three radially elongated openings formed in the frusto-conical plane of the rim or formed in the radially outer end of the support element adjacent the frusto-conical plane of the rim; and
    at least three connecting elements extending through and connecting the frusto-conical plane of the rim and the radially outer end of the support element adjacent the frusto-conical plane of the rim, wherein each one of the connecting elements can move radially within a respective one of the radially elongated openings,
    wherein, during use of the vehicle wheel, the different materials of the metal support element and the fibre-reinforced polymer rim cause different thermal expansions of those elements, which produces stress forces between these elements, and the radially elongated openings enable radial movement therein of the connecting elements, which in turn enables radial movement by the metal support elements relative to the fibre-reinforced polymer rim to relieve those stress forces.

13. The wheel according to claim 12, wherein the angle α of the frusto-conical plane of the rim relative to the rotational axis of the wheel is between 45° and 80°.

\* \* \* \* \*